FOUR-PARTY STATION IDENTIFICATION CIRCUIT

Filed Dec. 31, 1954 4 Sheets-Sheet 1

INVENTOR
J. J. COLLINS
BY [signature]
ATTORNEY

Aug. 25, 1959 J. J. COLLINS 2,901,544

FOUR-PARTY STATION IDENTIFICATION CIRCUIT

Filed Dec. 31, 1954 4 Sheets-Sheet 2

INVENTORS
J. J. COLLINS
BY [signature]
ATTORNEY

FOUR-PARTY STATION IDENTIFICATION CIRCUIT

Filed Dec. 31, 1954

INVENTOR
J. J. COLLINS
BY
ATTORNEY

FOUR-PARTY STATION IDENTIFICATION CIRCUIT

INVENTOR
J. J. COLLINS
BY [signature]
ATTORNEY 2,901,544
Patented Aug. 25, 1959

2,901,544

FOUR-PARTY STATION IDENTIFICATION CIRCUIT

John J. Collins, Jersey City, N.J., assignor to American Telephone and Telegraph Company, a corporation of New York Application December 31, 1954, Serial No. 479,143

6 Claims. (Cl. 179—17)

This invention relates to telephone systems and more particularly to such systems in which each of a group of party line subscriber stations is to be individually identified.

A variety of telephone identification systems well known in the art now provide identification of each of a plurality of subscriber stations, such identification systems being used to determine the identity of a calling subscriber station in order that charges for service may be correctly assessed; however, such systems suffer from one or more deficiencies among which are: restrictions on speed of operation, complexity of identification circuitry and associated components, and inability to operate when connected to existing switching systems without modification.

One general object of this invention is to provide an improved party line telephone substation identifier.

More specifically, objects of this invention are to provide party line identification with simplified circuitry, enable connection of identifiers to existing equipment without need for modification, and provide means for rapid and accurate identification.

Accordingly, one feature of this invention pertains to the provision of one identifier circuit for a plurality of party lines, thereby simplifying circuitry and reducing the number of associated components.

In accordance with another feature of this invention, the identifier is constructed for connection to existing telephone switching systems without requiring modification thereof.

In accordance with a further feature of this invention, the speed of identification is substantially increased whereby a single identifier circuit may be used with a plurality of party lines.

In accordance with still another feature of this invention, check circuits are provided within the identifier circuitry to assure greater accuracy of operation.

These and other features of the invention will be apparent from the following description of a preferred embodiment of the invention with reference to the drawings in which.

Figure 1:
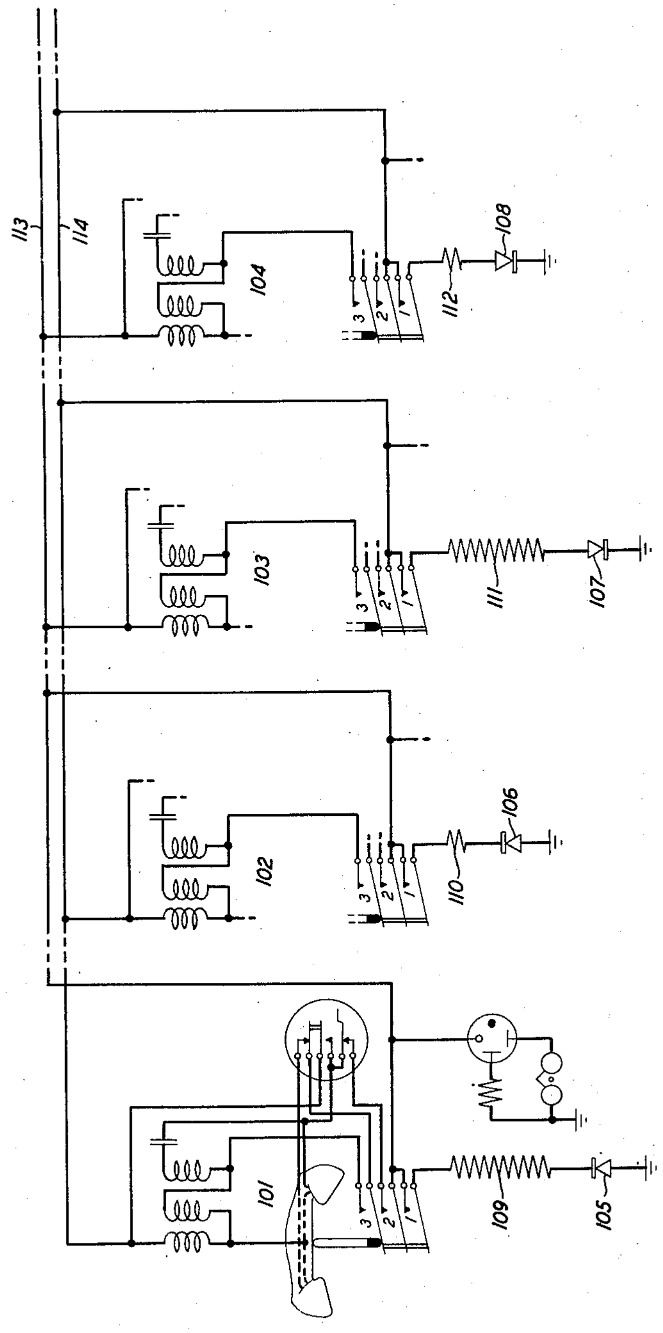
Fig. 1 shows a subscriber's line with four party stations connected thereto, together with circuitry internal to each station, and conventional means for extending connections thereto.

Referring to Fig. 1, four otherwise conventional telephone sets are each equipped with an asymmetrical directional current device, such as a dry disc or point contact rectifier, one terminal of which is connected to ground. In the circuits of subscriber stations 101 and 102, the asymmetrical current devices 105 and 106 are connected to conduct current flowing from ground only, whereas in the circuits of stations 103 and 104, the connections of asymmetrical current devices 107 and 108 are reversed to allow flow of current to ground only. Connected to the remaining terminal of each of these asymmetrical devices, on the side opposite to ground, are resistors 109, 110, 111 and 112 for subscriber sets 101, 102, 103 and 104, respectively. The resistors 110 and 112 may be any suitable magnitude (for example, 1000 ohms) and the resistors 109 and 111 may likewise be any suitably greater value (for example, 5000 ohms) sufficient to limit test current to a value which will cause operation of either of polar relays 465 and 466 but which will be insufficient to cause operation of marginal relay 460 as hereinafter described. It may be noted at this point that relay 460 is of the marginal type, that is, it will not operate in response to currents of less than moderate magnitude but will operate in response to currents of moderate magnitude, whereas relays 465 and 466 are of the polar variety and of opposite polarity, relay 465 being polarized to operate only in response to currents flowing from it to relay 460; and relay 466 being polarized to operate only in response to currents flowing to it from relay 460. Although typical magnitudes of resistance for resistors 109, 110, 111 and 112 have been hereinbefore disclosed, it will be apparent that optimum magnitudes will be dependent upon the sensitivities and operating characteristics of relays 460, 465 and 466.

Due to the above-described combination of resistors and asymmetrical current devices, application of an alternating potential from source 450 to line conductors 113 and 114 via intervening circuitry will cause currents of different polarities and magnitudes to flow in response to operation of the switchhooks of different individual subscriber sets, to wit: operation of the switchhook of subscriber set 101 completes a path from line conductor 113 through a switchhook contact, resistor 109, and directional current device 105 to ground, the polarity of device 105 being such that current is allowed to flow only from ground into the circuit. Similarly, operation of the switchhook at station 102 completes a path for current flow from ground through directional current device 106, resistor 110 and switchhook contacts to line conductor 113. Test current thus flowing at subscriber station 102, although of the same polarity as the corresponding current flowing at subscriber station 101, is nevertheless of different magnitude because of the difference in magnitude of resistors 109 and 110. Similarly, corresponding currents flowing at subscriber stations 103 and 104 will be of the same polarity but opposite to that of the currents flowing at stations 101 and 102. Currents at stations 103 and 104, although of like polarity will be of different magnitude because of the difference in resistance of resistors 111 and 112. Thus, application of an alternating potential between conductors 113 and 114 and ground will cause a current to flow in response to operation of a subscriber's switchhook, which current differs in either polarity or magnitude from current flowing in response to operation of any of the switchhooks at the remaining subscriber stations connected to that particular party line. Identification is made by apparatus now to be described, which responds differently to each of the four different currents characteristic of the four individual subscriber stations.

Figure 2:
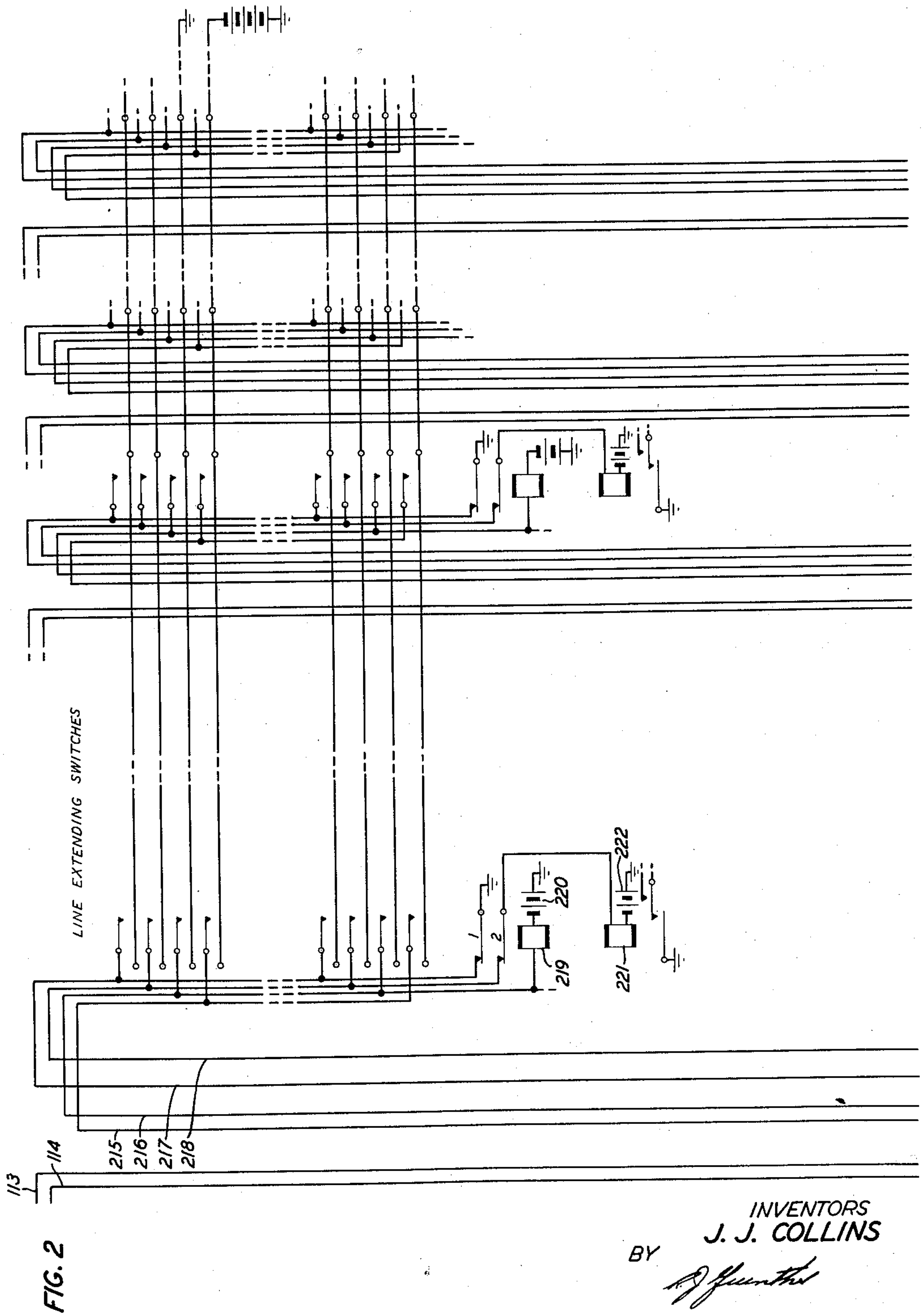
Fig. 2 shows connecting switching means together with associated relays.
Figure 3:
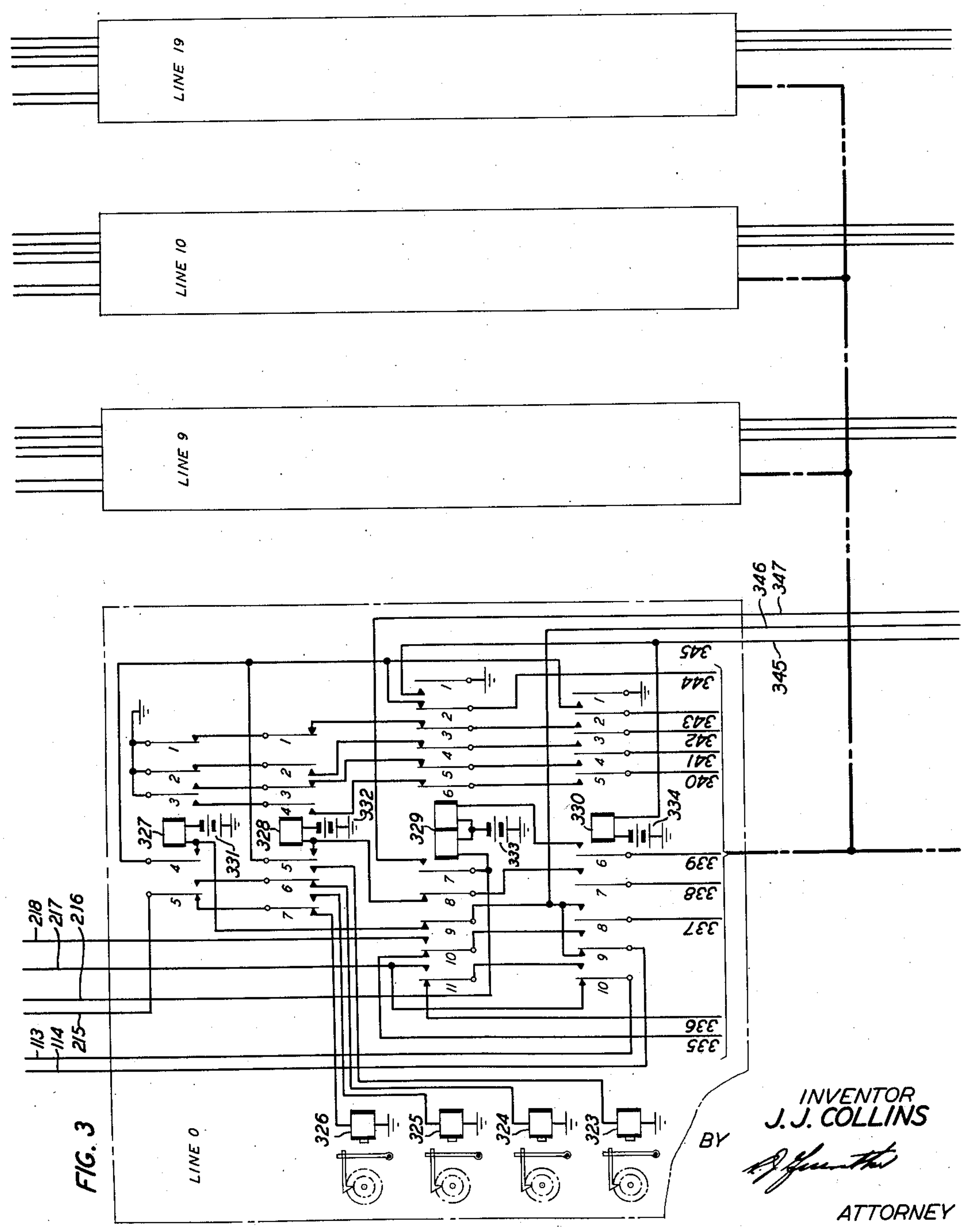
Fig. 3 shows message registering means, circuitry and associated relays for one of twenty party lines, together with representations of nineteen similar groups of apparatus associated with nineteen additional lines.
Figures 4, 5:
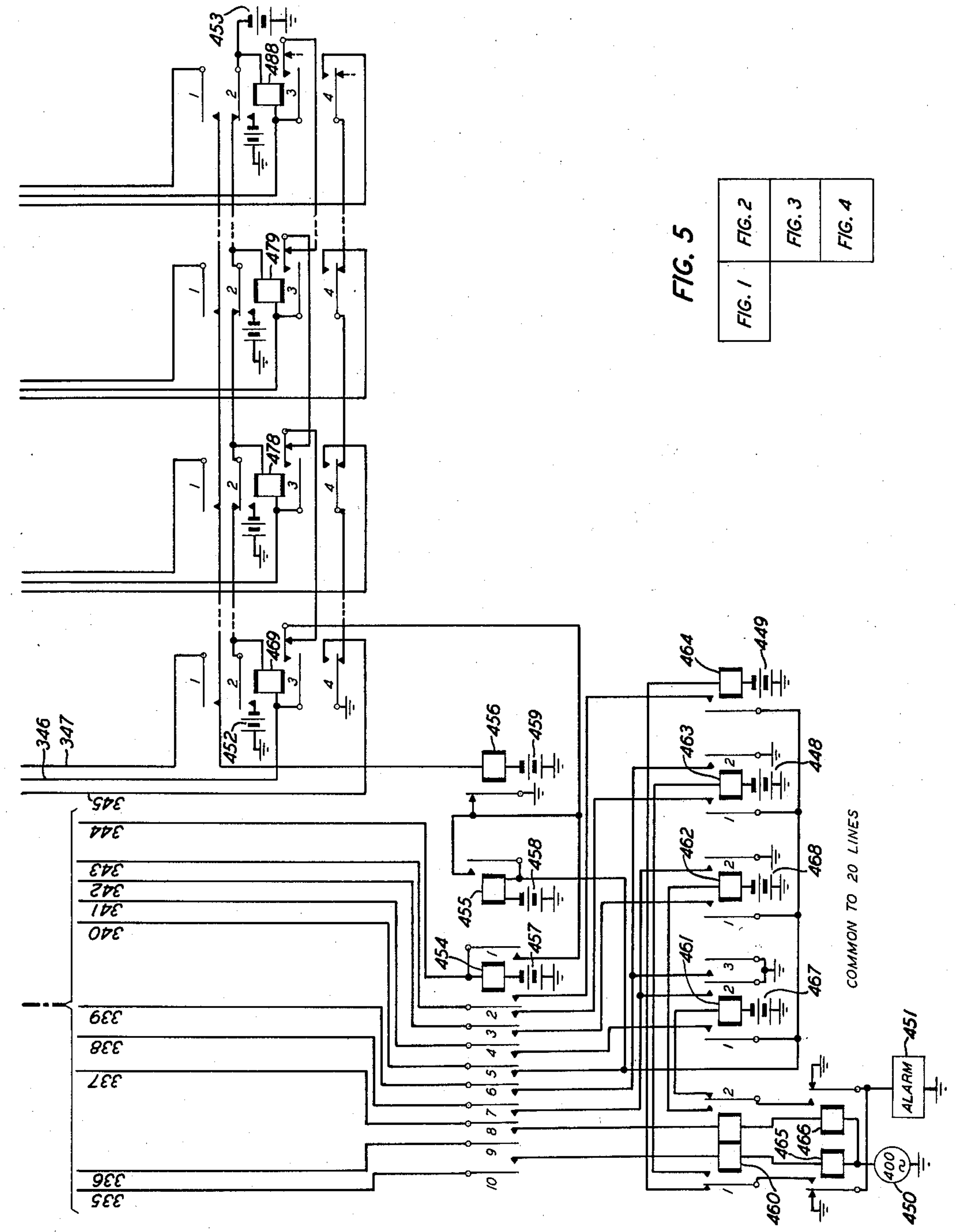
Fig. 4 shows additional circuitry relating to individual party lines together with an identifier circuit common to twenty party lines.
Fig. 5 shows the arrangement of the other figures of the drawing in relation to each other.

The identification circuitry shown in Figs. 2, 3 and 4 operates in the following manner: lifting of a subscriber's telephone instrument operates the associated switchhook to complete a circuit from ground, through the No. 1 back contacts of relay 219, conductor 218, No. 10 back contacts of relay 330, conductor 113, a subscriber's set and associated No. 2 switchhook contacts, conductor 114, No. 9 back contacts of relay 330, conductor 346, the coil of relay 469, serially through the No. 2 back contacts of relays 478, 479 and 488, to battery 453 and thence to ground. Relay 469 operates in this circuit and locks to battery 452 through its No. 2 contacts. In addition, it completes a circuit to operate relay 330 from ground through its No. 4 front contacts, conductor 345, the coil of relay 330, and thence through battery 334 to ground. Relay 330, in operating, completes a circuit to energize relay 454 from ground, through the No. 1 contacts of relay 330, No. 2 contacts of relay 329, conductor 344, relay coil 454, to battery 457 and thence to ground. Relay 454, in operating, locks to ground through its No. 1 contacts and the contacts of relay 456; in addition, it completes a path from the source of alternating test potential 450 through the coil of relay 466, the right-hand coil of relay 460, No. 9 contacts of relay 454, conductor 336, No. 11 back contacts of relay 329, No. 10 front contacts of relay 330 to conductor 113. Relay 454 further completes a similar path from source of alternating test potential 450 through the coil of relay 465, the left-hand coil of relay 460, No. 10 contacts of relay 454, conductor 335, No. 10 back contacts of relay 329, No. 9 front contacts of relay 330, and thence to conductor 114, thus applying alternating test potential to both line conductors. Thus far, operation of the identification arrangement is identical irrespective of the identity of the particular calling subscriber; however, test currents that now flow in line conductors 113 and 114 and which differ, as hereinbefore desscribed, in magnitude or polarity depending upon the identity of the calling subscriber, will cause subsequent steps in identification procedure to differ correspondingly in the following manner:

Test current flowing in response to closure of station 101 switchhook contacts will be conducted from ground, through unidirectional current device 105, resistor 109, No. 1 switchhook contacts, conductor 113 and thence as previously traced to alternating potential source 450 via the right-hand coil of relay 460 and the winding of relay 466. The magnitude of this current will be relatively low because resistance 109 is relatively large. This current will be sufficient to operate relay 466 but not relay 460. Relay 466 in operating, completes a circuit from ground through the back contacts of relay 465, front contacts of relay 466, No. 2 back contacts of relay 460 and the coil of relay 461 to battery 467 and thence to ground. Relay 461 operates and completes a circuit from ground through its No. 3 contacts, No. 7 contacts of relay 454, conductor 338, No. 7 contacts of relay 330, No. 8 contacts of relay 329, through the coil of relay 328 to battery 332, and thence to ground, thus operating relay 328. In addition, relay 461 completes a circuit from ground through its No. 2 contacts, No. 8 contacts of relay 454, conductor 337, No. 8 contacts of relay 330, No. 9 contacts of relay 329, the coil of relay 327, to battery 331 and thence to ground, thus operating relay 327. Relay 461 also completes a sequence check circuit from ground through No. 3 contacts of relay 327, No. 4 contacts of relay 328, No. 6 contacts of relay 329, No. 5 contacts of relay 330, conductor 340, No. 5 contacts of relay 454, No. 1 contacts of relay 461, and thence in two directions: in one direction through the coil of relay 455 to battery 458 and thence to ground, thus operating relay 455 which locks to ground through the contacts of relay 456; in the other direction through the No. 6 contacts of relay 454, conductor 339, No. 6 contacts of relay 330, the right-hand coil of relay 329, to battery 333 and thence to ground, thus operating relay 329. Functions performed by the operation of relays 329 and 455 are identical irrespective of the identity of the calling party. Relays 327 and 328, in operating, complete a path from conductor 215, through the No. 5 front contacts of relay 327, the No. 6 front contacts of relay 328, and the coil of message register magnet 323 to ground. By connecting contacts of relays 327 and 328 in series with contacts of auxiliary identification relays 461, 462, 463 and 464, checking and sequence circuits are provided to prevent operation of relays 455 and 329 in the event relays 327 and 328 do not respond correctly to operation of relays 461, 462, 463 and 464.

In somewhat similar manner, test current flowing in response to closure of station 102 switchhook contacts will be conducted from ground through unidirectional current device 106, resistor 110, No. 1 switchhook contacts, conductor 113, No. 10 front contacts of relay 330, No. 11 back contacts of relay 329, conductor 336, No. 9 contacts of relay 454, the right-hand coil of relay 460, the winding of relay 466, and thence through the source of alternating test potential 450 to ground. The magnitude of this test current will be relatively large because the magnitude of resistance 110 is relatively small. The test current will therefore be sufficient to operate both relays 460 and 466, thus completing a circuit from ground, through the back contacts of relay 465, the front contacts of relay 466, the No. 2 front contacts of relay 460, the coil of relay 462 to battery 468 and thence to ground. Relay 462 operates and completes a circuit from ground, through its No. 2 contacts, No. 8 contacts of relay 454, conductor 337, No. 8 contacts of relay 330, No. 9 contacts of relay 329, and the coil of relay 327 to battery 331 and thence to ground. In addition, operation of relay 462 completes a sequence check circuit from ground, through the No. 2 front contacts of relay 327, No. 3 contacts of relay 328, No. 5 contacts of relay 329, No. 4 contacts of relay 330, conductor 341, No. 4 contacts of relay 454, No. 1 contacts of relay 462, and thence in two directions: in one direction through the coil of relay 455 to battery 458 and thence to ground, thus operating relay 455 which locks to ground through the contacts of relay 456; in the other direction through the No. 6 contacts of relay 454, conductor 339, No. 6 contacts of relay 330, the right-hand coil of relay 329 to battery 333 and thence to ground, thus operating relay 329. Relay 327, in operating, completes a path from conductor 215, through its No. 5 front contacts, No. 6 back contacts of relay 328, the coil of message register magnet 324 and thence to ground.

Again in a somewhat similar manner test current flowing in response to closure of station 103 switchhook contacts will be conducted to ground through unidirectional current device 107, resistor 111, No. 1 switchhook contacts, conductor 114, No. 9 front contacts of relay 330, No. 10 back contacts of relay 329, conductor 335, No. 10 contacts of relay 454, the left-hand coil of relay 460, the coil of relay 465 and thence through the source of alternating test potential 450 to ground. The magnitude of this test current will be relatively small because the magnitude of resistance 111 is relatively high, and this current, although sufficient in magnitude to operate relay 465, is insufficient to operate relay 460. Operation of relay 465 therefore completes a circuit from ground, through the back contacts of relay 466, front contacts of relay 465, No. 1 back contacts of relay 460, and the coil of relay 464 to battery 449 and thence to ground. Relay 464, in operating, closes through no circuit from ground to one or more of relays 327 and 328, as does the operation of the remaining three identification relays 461, 462 and 463. Therefore, a path exists from conductor 215, through No. 5 back contacts of relay 327, No. 7 back contacts of relay 328 and thence through the coil of message register operating magnet 326 to ground. Operation of relay 464, however, completes a sequence check circuit from ground, through No. 1 contacts of relay 327, No. 1 contacts of relay 328, No. 3 contacts of relay 329, No. 2 contacts of relay 330, conductor 343, No. 2 contacts of relay 454, contacts of relay 464 and thence in two directions: in one direction through the coil of relay 455 to battery 458 and thence to ground, thus operating relay 455 which locks to ground through the contacts of relay 456; in the other direction through No. 6 contacts of relay 454, conductor 339, No. 6 contacts of relay 330, the right-hand coil of relay 329 to battery 333 and thence to ground.

Again in a somewhat similar manner, test current flowing in response to closure of station 104 switchhook contacts will be conducted to ground from asymmetrical device 108, through resistor 112, No. 1 switchhook contacts, conductor 114, No. 9 front contacts of relay 330, No. 10 back contacts of relay 329, conductor 335, No. 10 contacts of relay 454, the left-hand coil of relay 460, the coil of relay 465, and thence through the source of alternating test potential 450 to ground. The magnitude of this test current will be relatively large because the magnitude of resistance 112 is relatively low. The test current will be sufficient to operate both relays 460 and 465, thus establishing a circuit from ground through back contacts of relay 466, front contacts of relay 465, No. 1 front contacts of relay 460, and the coil of relay 463 to battery 448 and thence to ground. Relay 463 in operating, closes a circuit from ground through its No. 2 contacts, No. 7 contacts of relay 454, conductor 338, No. 7 contacts of relay 330, No. 8 contacts of relay 329, the coil of relay 328 to battery 332 and thence to ground. In addition, operation of relay 463 completes a sequence check circuit from ground, through No. 2 back contacts of relay 327, No. 2 contacts of relay 328, No. 4 contacts of relay 329, No. 3 contacts of relay 330, conductor 342, No. 3 contacts of relay 454, No. 1 contacts of relay 463 and thence in two directions: in one direction through the coil of relay 455 to battery 458 and thence to ground, thus operating relay 455 which locks to ground through the contacts of relay 456; in the other direction through No. 6 contacts of relay 454, conductor 339, No. 6 contacts of relay 330, the right-hand coil of relay 329 to battery 333 and thence to ground, thus operating relay 329. Relay 328, in operating, completes a path from conductor 215, through No. 5 back contacts of relay 327, No. 7 front contacts of relay 328, the coil of message register operating magnet 325 and thence to ground.

Functions performed in response to operation of relays 455 and 329 will now be explained. Relay 455, in operating, locks to ground on the contacts of relay 456 and completes a circuit from ground through the No. 6 contacts of relay 454, conductor 339, No. 6 contacts of relay 330, the right-hand coil of relay 329, to battery 333 and thence to ground as aforesaid. Operation of relay 329 transfers line conductors 113 and 114 from conductors 336 and 335 to conductors 217 and 218, respectively, thereby disconnecting the source of alternating test potential 450 from said line conductors and extending the connection from the calling subscriber's station through to the associated line extending switching equipment, resulting in operation of line relay 221 over the calling loop and initiation by said relay of circuit operations by which the line is extended in the usual manner over line-extending switches to a register sender (not shown). In addition, operation of relay 329 disconnects relays 327 and 328 which, if operated, remain locked to ground through their own front contacts and the No. 1 contacts of relay 330. It also disconnects the above-mentioned sequence check circuits, and interrupts the circuit which originally energized relay 454 via conductor 344. Relay 454, however, does not thereby become deenergized since it is locked to ground over its own No. 1 contacts and the contacts of relay 456. One additional operation performed by relay 329 is the completion of a circuit from ground through its No. 1 contacts and the coil of relay 330 to battery 334 and thence to ground, thus locking relay 330, which is already operated, to ground via this path.

Disconnection of source of alternating test potential 450 from line conductors 113 and 114 causes test relays 460, 465 and 466 to reset to the deenergized condition, thereby releasing any one of relays 461, 462, 463 or 464 that may have been operated. No additional function, however, is performed in response to release of relays 460, 465, 466, 461, 462, 463 and 464 because relays 455 and 329 are maintained in the operated condition through alternate circuits to ground as explained above.

Transfer of connections from line conductors 113 and 114 to conductors 217 and 218 results in the operation of line relay 221 as above explained, and the extension of the calling line through line-extending switches in the usual manner to an outgoing trunk and to a register sender (both not shown), which in response to dial pulses from the calling station controls the further extension of the connection to the called subscriber's station. When the line is extended to the trunk, ground is applied to conductor 216 via the trunk line-extending switches in the well-known manner, whereupon a circuit is completed to the left coil of relay 329 to battery 333 and thence to ground; and through the No. 7 contact of relay 329, conductor 347, No. 1 contacts of relay 469, the coil of relay 456, to battery 459 and thence to ground, thus energizing relay 456. Relay 456, in operating, unlocks relays 454, 455 and 469. The release of relay 469 releases relay 456. Relay 327 and/or 328, if operated, remain operated through above-mentioned sealed-in circuits from ground through the No. 1 contacts of relay 330 and Nos. 4 and 5 contacts of relays 327 and 328, respectively. Relay 329 is maintained in the operated condition over its left coil and ground on conductor 216 as already explained, relay 330 being maintained locally operated by ground on the No. 1 contacts of relay 329. A source of message register operating potential is momentarily connected to conductor 215 by the associated switching means in response to removal of the called subscriber's handset and resulting closure of his switchhook contacts. This potential finds its way via circuitry traced hereinbefore through contacts of relays 327 and 328 to operate the correct one of message registers 323, 324, 325 or 326 to record the identity of the calling substation. In response to termination of the telephone connection by the calling party, the associated switching equipment removes ground from conductor 216, thereby causing relay 329 to release. Release of relay 329 releases relay 330, which in turn unlocks relays 327 and 328. The entire line identification system is now returned to its original condition and is ready to identify subsequent calling subscriber stations in the manner outlined above.

As previously mentioned, in accordance with a feature of this invention, a single identifier may be used with a plurality, say twenty party lines. The identifier, comprising relays 454, 455, 456, 460, 461, 462, 463, 464, 465, 466 and associated circuitry, is prevented from being connected to more than one party line at a time by interlocking paths through contacts of relays associated with each line, representative of which are relay 469 which is associated with line 0, relay 478 which is associated with line 9, relay 479 which is associated with line 10, and relay 488 which is associated with line 19. Lines 1 through 8 and 11 through 18, although not shown, are each provided with identical relays which are connected in a manner identical to the connections shown for relays 478 and 479, and which are hereinafter referred to as relays 470 through 477 and 480 through 487, respectively. The preventive interlocking circuits to which reference was previously made are provided from battery 453 serially through the No. 2 back contacts of relays 488 through 470 and from ground in the reverse direction serially through the No. 4 back contacts of relays 469 through 487. These interlocks prevent more than one of these relays from grounding a lead corresponding to conductor 345 at any time, thus preventing two relays corresponding to relay 330 from being energized simultaneously.

While I have illustrated my invention by a particular embodiment thereof, the invention is not limited in its application to the specific apparatus and particular arrangement therein disclosed. Various applications, modifications and arrangements of the invention will readily occur to those skilled in the art; for example, message registers could be replaced with other means to record or indicate identity of the calling subscriber.

The terms and expressions which I have employed in reference to the invention are used as terms of description and not of limitation, and I have no intention in the use of such terms and expressions of excluding equivalents of the features shown and described or parts thereof, but on the contrary, intend to include therein any and all equivalents, modifications and adaptations which may be employed without departing from the spirit of the invention.

What is claimed is:

1. In a telephone system, a line having a plurality of substations, each provided with a device connected in series with a resistance to ground to permit a flow of current in one direction and resisting its flow in the opposite direction, the resistance for each of certain of said substations being of lower value than the resistance for each of the remaining ones of said substations, a test circuit including a source of potential, a marginal relay and two oppositely polarized relays, a register for each of said substations, said registers being selectively operable by the relays of said test circuit, and means responsive to a calling condition on one of said stations for establishing a flow of current through the relays of said test circuit and the device and resistance of said calling substation for selectively operating the relays of said test circuit, thereby to operate the one of said registers which is individual to said calling substation.

2. In a telephone system having a plurality of lines and a plurality of substations connected to said lines, means to individually identify each substation, said means comprising a source of test potential, a test circuit operable in response to a calling condition placed on one of said lines by a calling substation connected thereto, said test circuit including said source, said line, and an asymmetrical current device and resistor connected at the calling substation, the asymmetrical current devices and resistors being constructed and arranged differently but cooperatively at each substation on a line to cause flow of test current distinctive in polarity and magnitude to each of said substations when calling, relay means responsive to said distinctive test currents to identify each of said calling substations in response to its distinctive current, and registering means to record the identity of each of said calling substations.

3. In a telephone system, having a plurality of lines and a plurality of substations connected to said lines, means to individually identify and to record the identity of each substation, said identifying means comprising a source of test potential, a resistor and asymmetrical current device connected in series at each substation, means to connect said test potential source and one of said pairs of resistors and asymmetrical current devices to a line in response to a calling condition of a substation connected to that line, said resistors and asymmetrical current device being constructed and cooperatively arranged to cause flow of test current distinctive in polarity and magnitude to each of said substations on a line in response to a calling condition of said substations, relay means responsive to said distinctive test currents to identify each of said substations, when calling, in response to its distinctive current, and register means to record the identity of each of said calling substations.

4. In a telephone system having a plurality of lines and a plurality of subscriber substations connected to siad lines, means to individually identify and to record the identity of each substation, said identifying means comprising a source of alternating test potential, a resistor and asymmetrical current device connected in series at each substation, means to connect said test potential between any one of said lines and ground and means at each substation to connect its resistor and asymmetrical current device from line to ground in response to a calling condition of the substation, said resistors and asymmetrical current devices being constructed and arranged differently but cooperatively at each of the pluralities of substations connected to the same line to cause test currents distinctive in polarity and magnitude to each of said substations to flow in response to calling conditions thereof, relay means to detect each of said current conditions, and register means to register the identity of said calling substations.

5. In a telephone system having a plurality of lines, a plurality of substations connected to said lines, means to individually identify and to record the identity of each substation, said identifying means comprising a source of alternating test potential, a resistor and asymmetrical current device connected in series at each substation, means to connect said test potential between any one of said lines and ground in response to operation of a subscriber station connected to that line, means at each substation to connect the resistor and asymmetrical current device at that substation from line to ground in response to operation of that substation, certain of said asymmetrical devices being connected to primarily conduct current from ground, others of said asymmetrical devices being connected to primarily conduct current to ground, the magnitudes of resistance of certain of said resistors being substantially equal and lower than the magnitudes of resistance of others of said resistors, the resistance of said others of said resistors being substantially equal in magnitude, the magnitude of resistance and polarities being arranged differently at each of the substations connected to any one line to cause test currents distinctive to each of said substations to flow in response to operation of said substations, marginal and polar relay means to operate differently in response to each of said distinctive test currents, and relay means to connect said marginal and polar relay means to register the identity of the calling subscriber station.

6. In a telephone system having lines and groups of pluralities of lines and a plurality of substations connected to each line within said groups of lines, means to individually identify and to record the identity of each substation connected to each line within said groups of lines, said identifying means comprising a source of alternating test potential for each of said groups, a resistor and asymmetrical current device connected in series at each substation in each group of lines, means to connect each of said test potentials between any one of its said group of lines and ground, said connection being made from one of said sources to one of its said lines at a time, said connection being further made to a line in response to a calling condition of a subscriber substation connected to that line, means at each substation to connect the resistor and asymmetrical current device at that substation from line to ground in response to a calling condition of that substation, certain of said asymmetrical devices being connected to primarily conduct current from ground, others of said asymmetrical devices being connected to primarily conduct current to ground, the magnitudes of resistance of certain of said resistors being substantially equal and lower than the magnitude of resistance of others of said resistors, the resistance of said others of said resistors being substantially equal in magnitude, resistors and asymmetrical current devices being arranged differently at each of the said substations connected to a given line to cause test currents distinctive to each of said stations to flow in response to said calling condition of said stations, said combinations of resistance and polarity being essentially duplicated at subscriber stations connected to each of the remaining lines within said groups of lines, marginal and polar relay means associated with each group of lines to operate differently in response to each of said distinctive test currents, and relay means to connect said marginal and polar relay means to register means to register the identity of the calling substation.

References Cited in the file of this patent

UNITED STATES PATENTS

| | | |
|---|---|---|
| 1,841,084 | Bragg | Jan. 12, 1932 |
| 2,306,173 | Logan | Dec. 22, 1942 |
| 2,523,657 | Gordon | Sept. 26, 1950 |